R. F. STEWART.
BUTTER MOLDING AND PRINT FORMING MACHINE.
APPLICATION FILED JAN. 5, 1912.

1,065,186.

Patented June 17, 1913.

4 SHEETS—SHEET 1.

R. F. STEWART.
BUTTER MOLDING AND PRINT FORMING MACHINE.
APPLICATION FILED JAN. 5, 1912.

1,065,186.

Patented June 17, 1913.

4 SHEETS—SHEET 2.

R. F. STEWART.
BUTTER MOLDING AND PRINT FORMING MACHINE.
APPLICATION FILED JAN. 5, 1912.

1,065,186.

Patented June 17, 1913.
4 SHEETS—SHEET 3.

Witnesses

Inventor
Richard F. Stewart
By
Attorneys

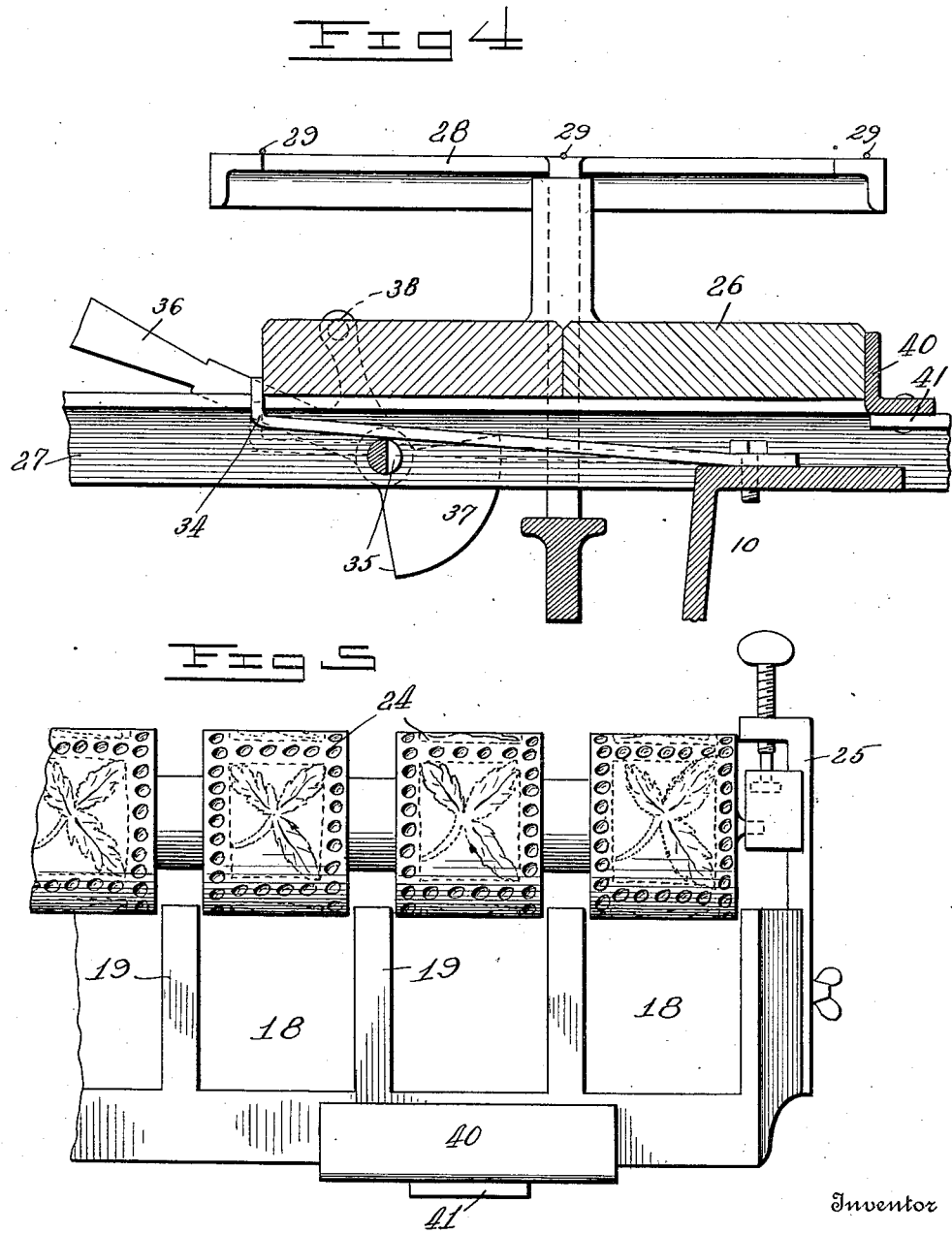

UNITED STATES PATENT OFFICE.

RICHARD F. STEWART, OF BRIARCLIFF MANOR, NEW YORK.

BUTTER MOLDING AND PRINT-FORMING MACHINE.

1,065,186.  Specification of Letters Patent.  Patented June 17, 1913.

Application filed January 5, 1912. Serial No. 669,607.

*To all whom it may concern:*

Be it known that I, RICHARD F. STEWART, a citizen of the United States, residing at Briarcliff Manor, in the county of Westchester and State of New York, have invented new and useful Improvements in Butter Molding and Print-Forming Machines, of which the following is a specification.

This invention relates to machines for molding and cutting soft material and in the particular embodiment which I have herein disclosed such material is soft butter, or as it is commonly known, "creamery" butter, which, as it comes from the churn, is soft and not as readily shaped and molded as tub butter.

The object of the machine is to provide mechanical means by which this material may be conveniently and expeditiously formed into compacted prints ready for wrapping, and this operation, by the use of the present machine, is carried out with a minimum handling of the material. I accomplish this object by providing a suitable hopper, into which the material is dumped and from which a definite amount is mechanically removed by a plunger or cut-off slide, which, in its movement, forces the block of material past a suitable compacting and gaging apparatus so as to insure proper size and weight and simultaneously divides the compacted mass into strips which are delivered to a suitable print cut-off which severs the strips into prints, this print cut-off being so disposed with respect to a loose board bottom that the prints will be fed forward each on its separate carrier board which may, if desired, be removed as the machine continues to operate and taken to the wrapping table or any suitable wrapping machine.

Figure 1:
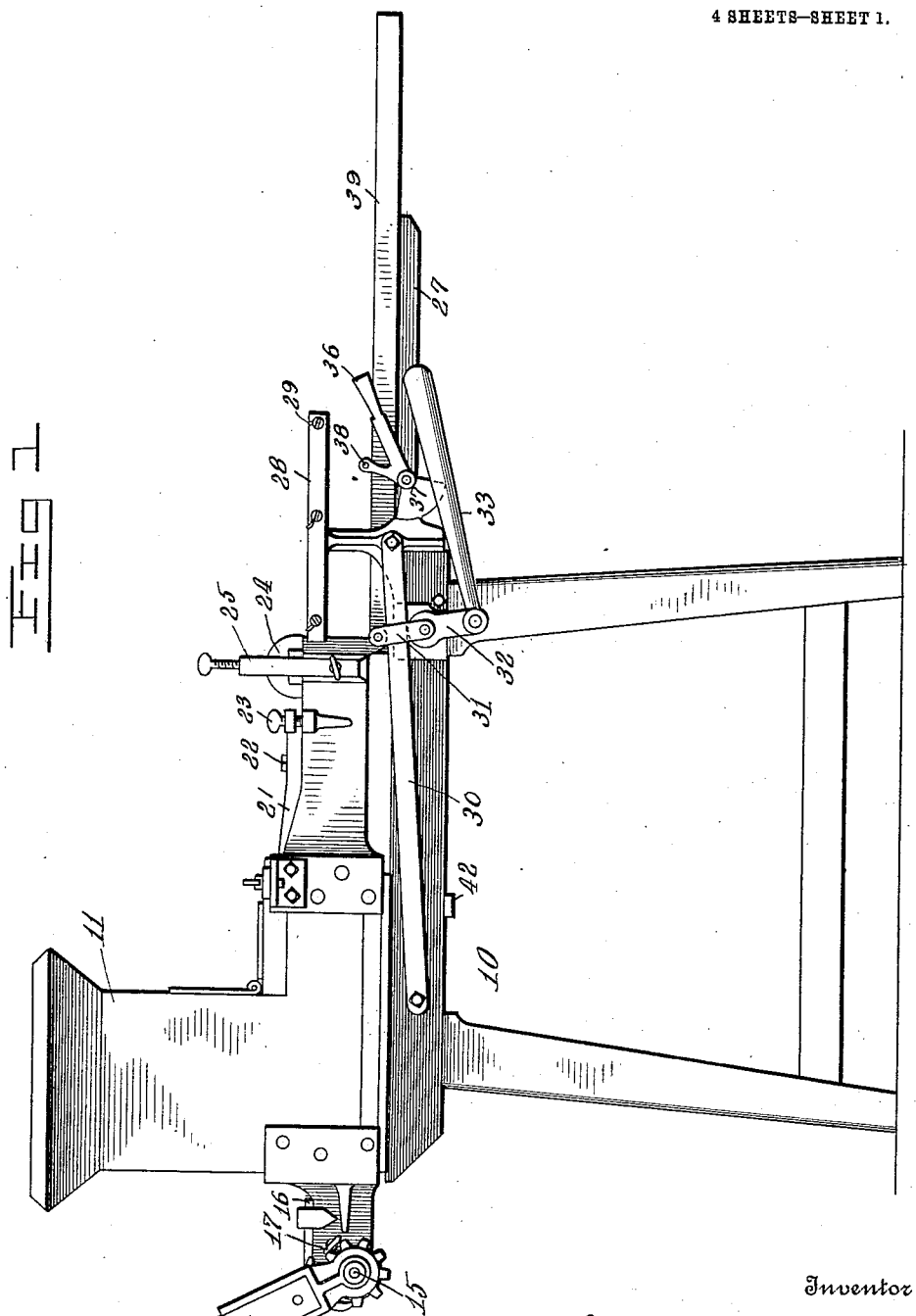
Figure 2:
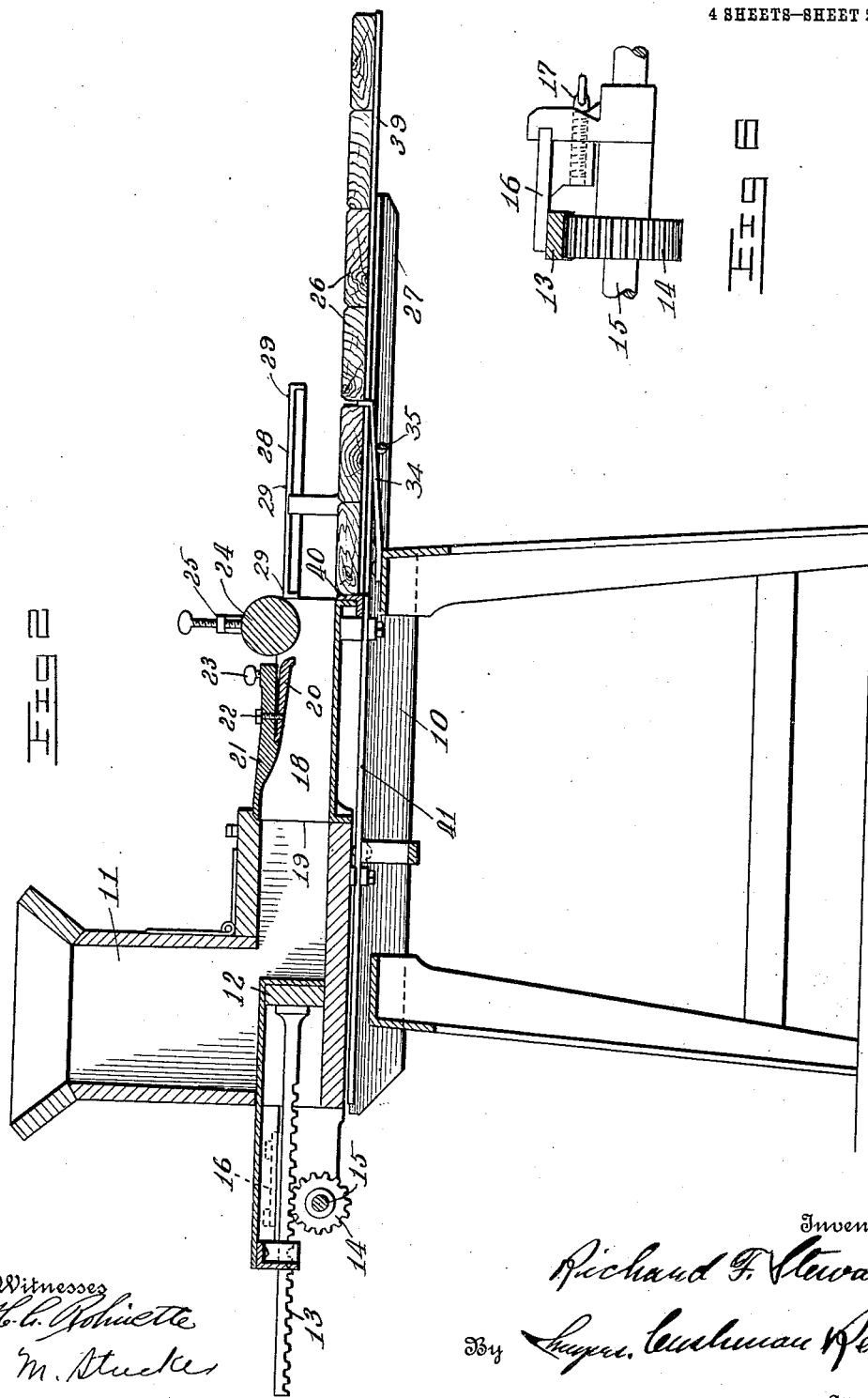
Figure 3:
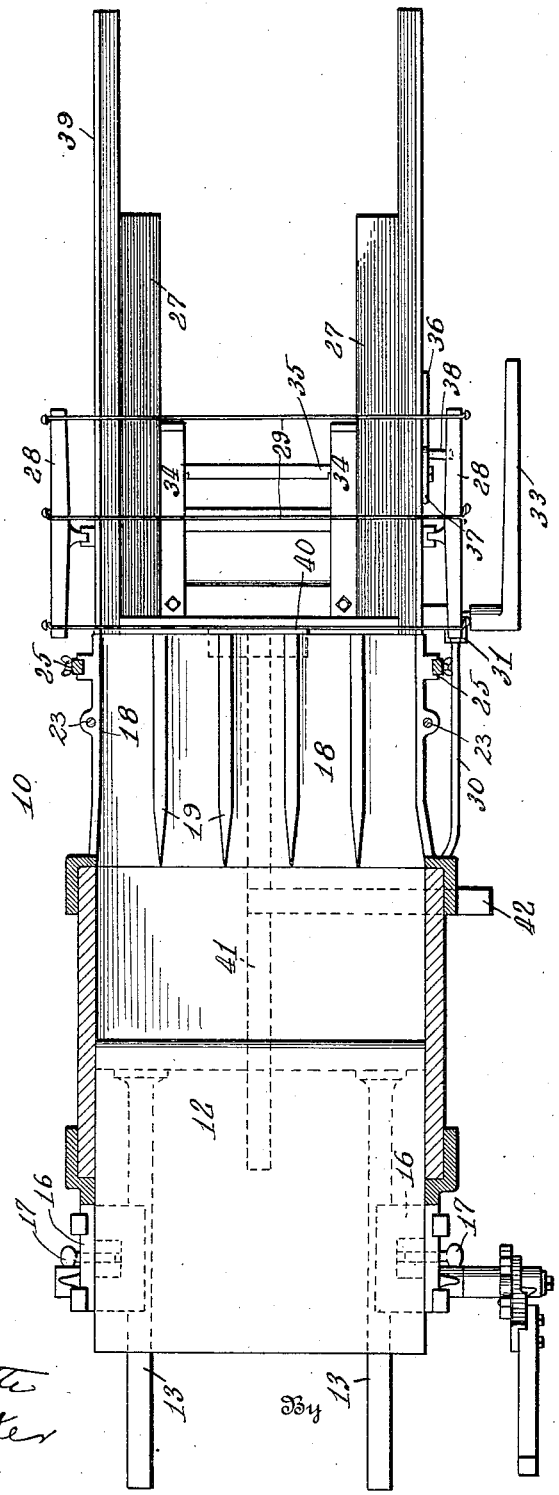

In the drawings herewith I have illustrated one embodiment of my invention, and in said drawings, Figure 1 is a side view of the machine embodying my invention; Fig. 2 is a sectional view substantially on the longitudinal center of the machine; Fig. 3 is a plan view with the hopper in section and the top of the strip-forming box removed; Fig. 4 is an enlarged detail view of the print-cutter; Fig. 5 is a detail view enlarged of the printing rolls. Fig. 6 is a detail view of the plunger rack and gear.

Referring to the drawings by numbers, like numbers indicating like parts in the several views, 10 indicates the machine table which may be of any suitable character, and is made up of supporting legs and bed portions. Mounted upon the supporting table 10 is the receiving hopper 11 which, as shown, is larger at the bottom than at the top so as to insure a proper down-feed of the material and to eliminate danger of choking. Beneath this open-bottom hopper 11 is a cut-off slide or plunger 12 of any suitable material, said cut-off having a hopper-closing apron to sustain the material in the hopper after the slide makes its forward stroke. The said cut-off slide 12 is driven by means of racks 13 extending rearwardly therefrom, which racks engage suitable pinions 14 of a shaft 15 driven in any suitable manner.

The racks 13 are slidingly mounted at their rear ends in supports 16, held by thumb-screws 17, to the side struts of the table, these supports 16 overlapping the racks so as to insure their engagement with the pinions 14. This construction is a very convenient one as it permits the racks 13 to be readily unshipped in case it is desired to dismantle or take apart the machine, for by loosening the thumb-screws 17 the supports 16 which hold the racks and pinions in engagement may be quickly removed, the racks unshipped and the plunger 12 withdrawn.

The mass of butter which is cut off by the plunger 12 is by it forced forward to a series of channels 18, five being shown, but it is of course obvious that any number desired will be adopted. These channels 18 are separated by relatively wide dividing ribs 19 having tapering or sharpened ends, as shown, and these ribs 19 divide the block of material into a series of strips which are forced forward through the channels. The strips, as they pass forward, are forced beneath a series of independently adjustable gage plates 20 which are pivotally connected at their rear ends with a top plate 21, each of the gage plates 20 being connected at its forward end with an independent adjusting screw 22, by means of which it may be raised or lowered. The top plate 21, rocks at its rear end and is adjustably mounted at its forward end by means of adjusting screws 23, so that this top plate 21 as a whole may be adjusted. As will be seen by this arrangement of gage plates, I may individually gage the respective strips as the block is forced through the channels 18 and the individual gages 20 having been brought to a proper position, the gage-carrying top plat 21 may be adjusted as desired, thus insuring accurate gaging for size and weight of the strips.

As the strips leave the channels 18, they will be separated from one another by reason of the relatively wide cutting ribs or walls 19 and the strips thus separated preferably pass beneath suitable rollers 24, which print the strips in sections of any desired size and weight, as for example, "pound" sections or prints, these printing rollers 24 being adjustably mounted in standards 25, so that they may be raised or lowered to give the proper printing contact. The rollers 24 are mounted, as shown, separated slightly from one another so as to register with each of the strip-forming channels of the machine. The strips pass from the printing roller to the loose board bottom ready for the cut-off, this loose board bottom being made up of a series of carrier boards 26, each of proper width to take the prints, said boards being supported at their ends on strut run-ways 27, which are of L-shaped angle-iron, and permit the carrier boards to move freely thereon. The strips thus laid upon the carrier boards in separated condition by reason of the fairly wide dividing plates 19, are ready to be cut into prints, and this is accomplished by means of a vertically moving print-cutter comprising two connected side frames 28 sliding in suitable ways on the sides of the machine and having print-cutting wires 29 tensioned across the frame by suitable tensioning devices, as shown in Figs. 3 and 4. The print-cutting frame is operated by means of a lever 30 pivoted to the machine frame at one end and connected at the other to the cutting frame, this lever passing through a link 31, connected with the crank arm 32 on a pivoted handle 33, so that as the handle is thrown down the lever will be swung and the vertical cutting frame reciprocated. The cutting wires 29 will pass down through the strips into the grooves formed by the chamfered ends of the carrier boards 26, as best shown in Fig. 4, completely severing the ends of the strips into the desired number of prints, the machine here shown producing ten prints at each operation of the vertical cutter, although this may be varied as desired.

In order to prevent movement of the carrier boards 26, during the pushing forward of the strips, I provide a locking dog 34 which is mounted on the machine frame and engages at its forward end the outer one of the two boards, as shown in Figs. 2 and 4, so as to prevent their movement. Normally, this locking dog 34 lies in the dotted-line position shown in Fig. 4, but may be thrown up into locking engagement with the boards by means of the cam 35 of a rod or shaft mounted in the side frames of the machine, a suitable handle 36 being provided by which the cam may be thrown into and out of operation to raise and lower the dog, and preferably this handle will be provided with a counterbalancing weight 37 to maintain the cam normally in idle position with the locking dog 34 locked. In order to insure releasing of the boards when the frame descends, I provide the handle 36 with a projecting arm carrying a pin 38 so positioned as to lie in the path of the descending frame 28 and when struck by it swing the handle and cam 35 to unlocked position. When the prints have been formed, the boards 26 carrying these prints are slid forward along the ways 39 by means of a push bar 40 (see Figs. 2 and 4), said push bar being carried by a rod 41 mounted in suitable supports beneath the forming box and provided with a handle 42 by which the operator may move the push bar 40 forward and push the carrier boards with prints thereon from beneath the cutter frame, after which these boards may be removed by the operator without the necessity of handling the butter, each board carrying in a machine of the present capacity five prints of butter separated one from the other lengthwise of the board so as to permit them to be readily grasped by a wrapper and manually wrapped, if desired, or they may in this condition be delivered to a suitable wrapping machine to be mechanically wrapped.

Although I have shown a particular construction, it will be understood that many mechanical changes may be made without departing from the spirit of my invention, and all such equivalents and expedients I deem to be within the range of my invention. Furthermore, while the machine is shown and described as a butter molding and print-forming machine, and the claims specify butter-handling instrumentalities, it will be understood that its use is not limited to this particular commodity as it is capable of use with any similar material which it is desirable to mold and to form into prints or blocks.

Having thus described my invention, I claim:

1. In a machine of the class described, the combination of the following instrumentalities; a butter-receiving chamber, means for advancing the butter-mass in said chamber, means for dividing the mass into a plurality of strips, and spacing such strips an appreciable distance apart, a top plate adjustable over the strips, and individual plates adjustable on the top plate for gaging each strip individually.

2. In a machine of the class described, the combination of the following instrumentalities; a butter-receiving chamber, means for advancing the butter-mass, means for dividing the mass into a plurality of strips, an individual gage plate for each strip, and means for collectively adjusting said gage plates.

3. In a machine of the class described, the combination of the following instrumentalities; a butter-receiving chamber, means for advancing the butter-mass, means for dividing the mass into a plurality of strips, an individually adjustable gage plate for each strip, and means for collectively adjusting said gage plates.

4. In a machine of the class described, the combination of the following instrumentalities; a butter-receiving chamber, means for advancing the butter-mass, means for dividing the mass into a plurality of strips, an individual gage plate for each strip, and an adjustable cover plate for the chamber to which said gage plates are secured.

5. In a machine of the class described, the combination of the following instrumentalities; a butter-receiving chamber, a plunger for forcing the butter-mass through said chamber, and a downwardly flaring hopper delivering to said chamber.

6. In a machine of the class described, the combination of the following instrumentalities; a butter-receiving chamber, a plunger for forcing the butter-mass through said chamber, and a shiftable carrier board to which the projected end of the butter-mass is delivered.

7. In a machine of the class described, the combination of the following instrumentalities; a butter-receiving chamber, a plunger for forcing the butter-mass through said chamber, a shiftable carrier board to which the projected end of the butter-mass is delivered, and means for locking said board at predetermined periods.

8. In a machine of the class described, the combination of the following instrumentalities; a butter-receiving chamber, a plunger for forcing the butter-mass through said chamber, a shiftable carrier board to which the projected end of the butter-mass is delivered, means for locking said board at predetermined periods, means for severing the projected end, and means operated by said severing means for controlling said locking mechanism.

9. In a machine of the class described, the combination of the following instrumentalities; a butter-receiving chamber, a plunger for forcing the butter-mass through said chamber, means for dividing the mass into strips, a removable carrier board slidingly mounted on the machine frame to which the projected end of the butter-mass is delivered, and means for locking said board at predetermined periods.

10. In a machine of the class described, the combination of the following instrumentalities; a butter-receiving chamber, a plunger for forcing the butter-mass through said chamber, means for severing the projected end of the butter-mass, and a plurality of removable carrier boards shiftably mounted beneath said severing means and provided with beveled edges to form receiving grooves for the cutting elements of the severing means.

11. In a machine of the class described, the combination of the following instrumentalities; a butter-receiving chamber, a plunger for forcing the butter-mass through said chamber, a shiftable carrier board to receive the projected end of said butter-mass, means for severing the projected end of said mass, means for preventing movement of said carrier board during the movement of the butter-mass, and means for throwing said locking mechanism out of action.

12. In a machine of the class described, the combination of the following instrumentalities; a butter-receiving chamber, a plunger for forcing the butter-mass through said chamber, a shiftable carrier board to receive the projected end of said butter-mass, means for severing the projected end of said mass, means for preventing movement of said carrier board during the movement of the butter-mass, and means for automatically throwing said locking mechanism out of action.

13. In a machine of the class described, the combination of the following instrumentalities; a butter-receiving chamber, a plunger for forcing the butter-mass through said chamber, a shiftable carrier board to receive the projected end of said butter-mass, means for severing the projected end of said mass, and means for preventing said chamber, a shiftable carrier board to movement of the butter-mass, said locking means being automatically unlocked by the movement of said severing means.

14. In a machine of the class described, the combination of the following instrumentalities; a butter-receiving chamber, a plunger for forcing the butter-mass through said chamber, a shiftable carrier board to receive the projected end of said butter-mass, means for severing the projected end of said mass, a locking dog to engage and hold said carrier board, a cam for operating said dog, and means for automatically shifting said cam and releasing said dog when the cutting mechanism descends.

15. In a machine of the class described, the combination of the following instrumentalities; carrier board to receive the projected end of said butter-mass, means for severing the projected end of said mass, a normally inactive locking dog, a cam for throwing said locking dog into position to hold said carrier board against movement, said cam being automatically thrown to release said dog on downward movement of said severing means.

16. In a machine of the class described, the combination of the following instrumentalities; a plunger for forcing the butter-mass through said chamber, a shiftable carrier board to which the projected end of the butter-mass is delivered, means for severing the projected end of the mass, and means for shifting said carrier board after the projected end has been severed.

17. In a machine of the class described, the combination of the following instrumentalities; a plunger for forcing the butter-mass through said chamber, a shiftable carrier board to which the projected end of the butter-mass is delivered, means for locking said board at predetermined periods, means for severing the projected end of the mass, and means for shifting said carrier board after the projected end has been severed.

18. In a machine of the class described, the combination of the following instrumentalities; a butter-receiving chamber, a plunger for forcing the butter-mass through said chamber, a plunger advancing rack, a rack advancing pinion, and a detachable rack-engaging plate to maintain said rack and pinion in engagement.

19. In a machine of the class described, the combination of the following instrumentalities, a butter-receiving chamber, a plunger for forcing the butter-mass through said chamber, a plunger advancing rack, a rack-engaging gear, and a rack-holding plate removably secured to the frame of the machine and overlying said rack to maintain the rack and gear in engagement and permit a ready disengagement to remove the plunger.

In testimony whereof I have hereunto set my hand in presence of two subscribing witnesses.

RICHARD F. STEWART.

Witnesses:
WILLIAM A. PRATT,
KATHERINE C. GLANVILLE.

Copies of this patent may be obtained for five cents each, by addressing the "Commissioner of Patents, Washington, D. C."